United States Patent [19]

Sauer

[11] Patent Number: 4,708,375

[45] Date of Patent: Nov. 24, 1987

[54] HOSE COUPLING

[75] Inventor: Heinz Sauer, Ronneburg, Fed. Rep. of Germany

[73] Assignee: Rasmussen GmbH, Maintal, Fed. Rep. of Germany

[21] Appl. No.: 888,113

[22] Filed: Jul. 18, 1986

[30] Foreign Application Priority Data

Jul. 24, 1985 [DE] Fed. Rep. of Germany ....... 3526447
May 12, 1986 [DE] Fed. Rep. of Germany ....... 3615904

[51] Int. Cl.$^4$ .......................... F16L 33/22; F16L 37/12
[52] U.S. Cl. ..................................... 285/258; 285/319; 285/921
[58] Field of Search ................. 285/13, 242, 243, 256, 285/257, 258, 290, 319, 320, 331, 371, 376, 362, 423, 921

[56] References Cited

U.S. PATENT DOCUMENTS

| | | | |
|---|---|---|---|
| 96,286 | 10/1869 | Thompson | 285/256 |
| 1,228,549 | 6/1917 | Furduy. | |
| 1,890,290 | 12/1932 | Hargreaves | 285/258 |
| 2,071,478 | 2/1937 | Wick. | |
| 2,684,256 | 7/1954 | Krukowski | 285/320 |
| 3,394,954 | 7/1968 | Sarns. | |
| 3,588,149 | 6/1971 | Demler | 285/319 |
| 3,628,991 | 12/1971 | Thiele | 285/423 |
| 4,486,034 | 12/1984 | Sauer | 285/319 |
| 4,508,374 | 4/1985 | Kantor | 285/319 |
| 4,554,949 | 11/1985 | Sell | 285/423 |

FOREIGN PATENT DOCUMENTS 3444817 7/1985 Fed. Rep. of Germany.
211838 3/1925 United Kingdom.
1145896 3/1969 United Kingdom.

Primary Examiner—Cornelius J. Husar
Assistant Examiner—Anthony Knight
Attorney, Agent, or Firm—Peter K. Kontler

[57] ABSTRACT

The end portion of a hose is or can be bonded to the front section of a tubular connector whose rear section surrounds the end portion of the hose and has integral pallets with teeth engaging a circumferentially extending external rib of a nipple which receives the front section of the connector with the interposition of an annular sealing device. A deformable sleeve in the end portion of the hose biases the hose radially outwardly against the internal surface of the rear section of the connector.

38 Claims, 16 Drawing Figures

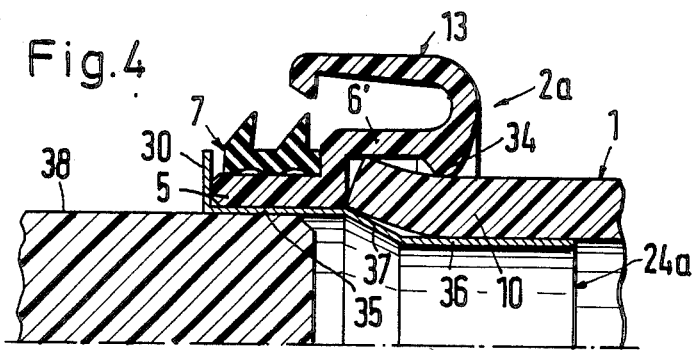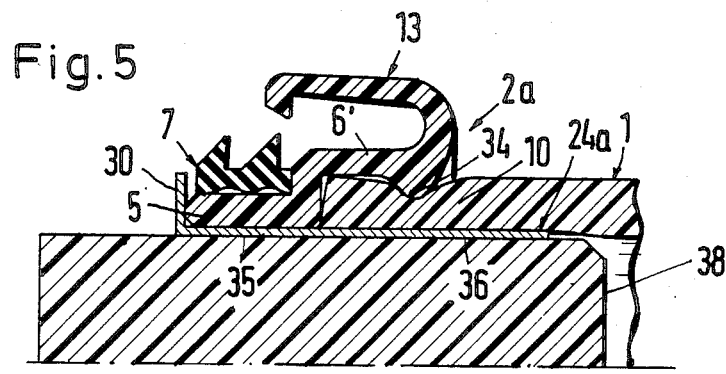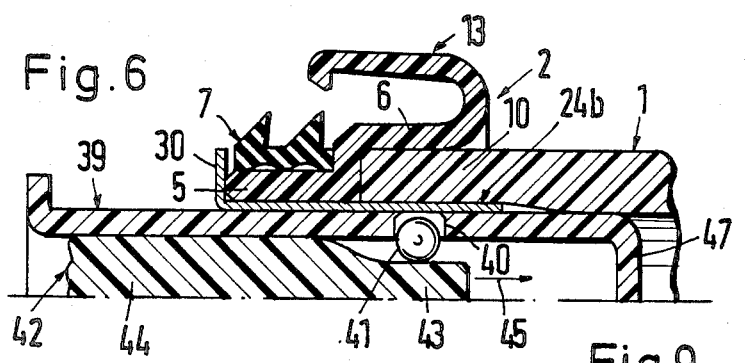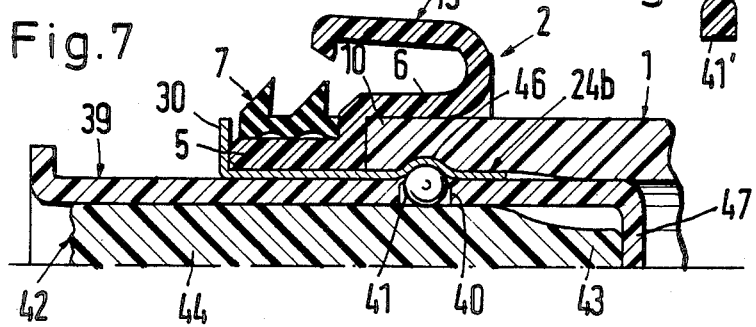

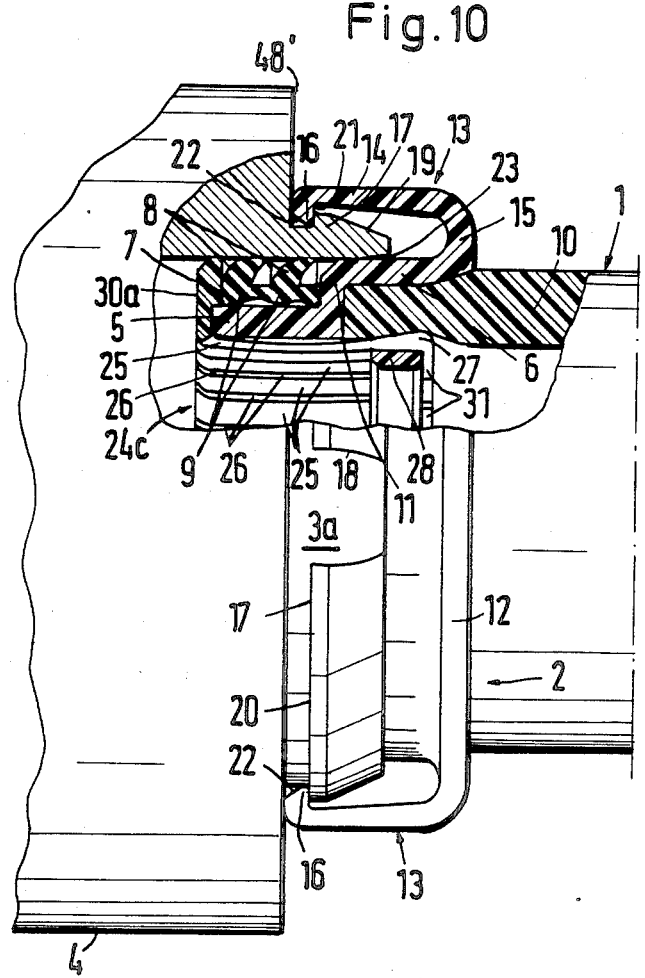

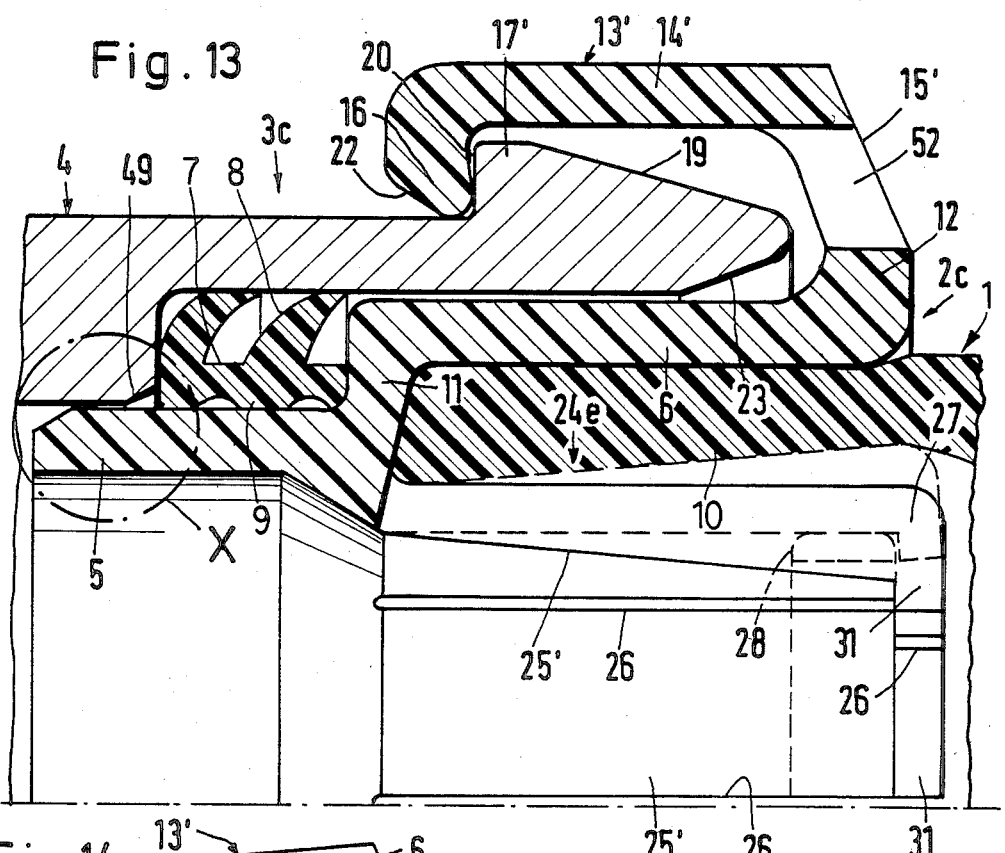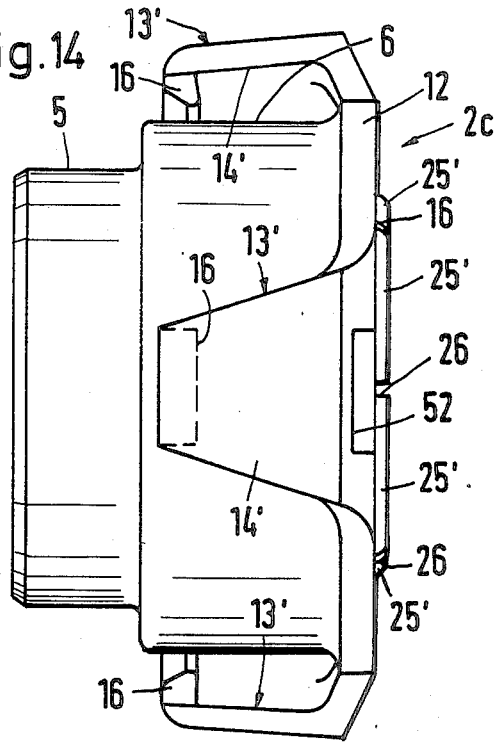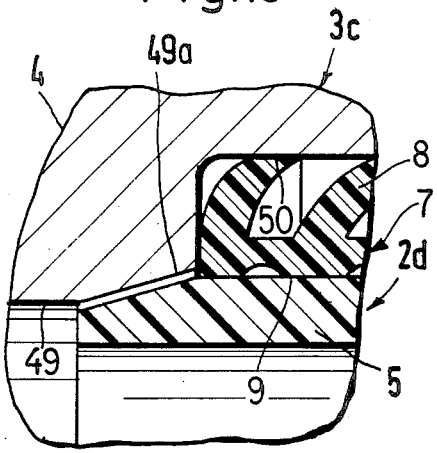

HOSE COUPLING

CROSS-REFERENCE TO RELATED APPLICATION

The hose coupling of the present invention constitutes an improvement over and a further development of the hose coupling which is disclosed in the commonly owned copending patent application Ser. No. 881,194 filed July 2, 1986.

BACKGROUND OF THE INVENTION

The invention relates to couplings in general, and more particularly to improvements in couplings for hoses and similar conduits. Still more particularly, the invention relates to improvements in couplings which can be used to sealingly connect the end portion of a hose to a nipple, e.g., to a nipple under the hood of a motor vehicle.

It is known to provide the coupling between a hose and a nipple with an annular sealing device which is forced into the nipple to prevent uncontrolled escape of the conveyed gaseous or hydraulic fluid. It is also known to connect the end portion of the hose with a tubular connector which is surrounded by the sealing device and can be separably coupled to the nipple by one or more resilient hooks which are integral with a ring. The latter is placed around and is maintained in frictional engagement with the external surface of the tubular connector. The end portion of the hose is slipped onto the rear portion of the connector behind the ring, and the front portion of the connector has circumferential grooves for O-rings which constitute the sealing device and are forced into the nipple before the hooks engage a flank at the exterior of the nipple. The outer diameter of the front portion of the connector matches or approximates the inner diameter of the nipple. The external surface of the nipple is further provided with substantially wedge-like cams which can disengage the hooks from the flank in response to rotation of the nipple and the end portion of the hose relative to each other so that the connector can be withdrawn from the nipple.

A drawback of the just described conventional coupling is its complexity, length, bulk and high cost. Moreover, the insertion of O-rings into the nipple necessitates the exertion of a substantial force. Still further, and since the end portion of the hose is merely slipped onto the rear portion of the connector, the seal between the hose and the connector is likely to be interrupted in response to increasing pressure in the interior of the hose and/or nipple; in fact, the hose is likely to become completely separated from the connector. Such separation can also take place in response to the application of a pronounced pull in a direction to move the end portion of the hose away from the nipple which receives the front portion of the connector. The frictional engagement between the ring, which carries the hooks, and the connector is often insufficient to prevent separation of the ring and connector from each other when the connector is pulled in a direction away from the nipple and/or vice versa.

OBJECTS AND SUMMARY OF THE INVENTION

An object of the invention is to provide a novel and improved coupling which is more reliable and simpler than heretofore known couplings.

Another object of the invention is to provide a hose coupling which is not likely to permit escape of the confined fluid medium or media in response to the exertion of a pull in a direction to separate a hose or an analogous first conduit from the nipple of a second conduit or the like.

A further object of the invention is to provide a novel and improved method of separably coupling the end portion of a flexible hose to a nipple.

An additional object of the invention is to provide a device, machine or apparatus which embodies the above outlined coupling.

Still another object of the invention is to provide novel and improved means for coupling the end portion of a plastic hose to a metallic or plastic nipple or the like.

An additional object of the invention is to provide a novel and improved connector which can be used in the above outlined coupling.

Another object of the invention is to provide a coupling which is short, which comprises a small number of simple and inexpensive parts, which can be used with advantage to establish a satisfactory seal between conduits serving to convey gaseous or hydraulic fluids at an elevated, medium or low pressure, and which can stand pronounced axial stresses.

Still another object of the invention is to provide a novel and improved connection between the tubular component and the hose which is to be separably coupled to a nipple or the like.

A further object of the invention is to provide a coupling wherein the attachment of the end portion of a hose or another conduit to a nipple necessitates the exertion of a relatively small force in the axial direction of the nipple. One feature of the invention resides in the provision of a coupling which comprises a first conduit (particularly a flexible hose) including a deformable first end portion having an external surface, a second conduit having a second end portion with an external projection in the form of a circumferentially extending rib or the like, a tubular connector having a first section extending into the second end portion and a second section having an internal surface surrounding the external surface of the first end portion, at least one resilient pallet provided on the connector and releasably engaging the projection to hold the first section of the connector against extraction from the second end portion, and means for biasing the first end portion from within so as to maintain the external surface of the first end portion in engagement with the internal surface of the second section. The coupling preferably further comprises annular sealing means interposed between the second end portion and the first section. The biasing means can comprise a radially expandible sleeve which is confined in the first end portion in radially expanded condition. The aforementioned sealing means can be disposed in an annular space which is defined by the first section of the tubular connector and the end portion of the second conduit. The pallet is preferably integral with the second section of the tubular connector.

The first section of the connector can be rigidly secured to the end portion of the first conduit. The end portion or the first conduit is preferably bonded to the first section of the connector. For this purpose, the end portions of the first conduit and the first section of the connector preferably consist of or contain a thermoplastic material so that they can be bonded to each other by application of heat. Alternatively, the first section of the connector can be secured to the end portion of the first conduit by a suitable adhesive. In all embodiments of the improved coupling, the end portion of the first conduit can be received in the second section of the connector in radially compressed condition.

The pallet is preferably integral with that end portion of the second section of the connector which is remote from the first section of the connector. The pallet can include an arcuate rear portion which is integral with the rear end portion of the second section of the connector and a second portion which is preferably elongated and extends in substantial parallelism with the axis of the connector and has an end portion provided with a protuberance (for example, a radially inwardly extending tooth) which engages the projection of the end portion of the second conduit. The rear end portion of the second section of the connector can constitute an annular flange which flares radially outwardly away from the end portion of the first conduit, and the rear end portion of the pallet is preferably arcuate and merges gradually into the flange of the second section of the connector.

The width of the pallet (as measured in the circumferential direction of the connector) preferably decreases in a direction from the second toward the first section of the connector to thus enhance the flexibility of the intermediate portion of the pallet. The intermediate portion of the pallet preferably decreases in thickness in a direction from its rear end portion toward the second conduit as measured radially of the connector. The taper is in a direction toward the projection on the end portion of the second conduit.

The outer diameter of the end portion of the first conduit in undeformed condition of the first conduit preferably exceeds the inner diameter of the first section of the tubular connector.

The projection of the end portion of the second conduit preferably includes a flank which extends substantially radially of the end portion of the second conduit and faces away from the end portion of the first conduit. The projection can be provided with at least one passage, and the protuberance of the pallet is caused to register with the passage preparatory to insertion of the first section of the connector into or preparatory to extraction of the first section of the connector from the end portion of the second conduit. The front flank of the protuberance on the pallet preferably tapers radially outwardly from the connector in a direction away from the second section of the connector.

The aforementioned annular sealing means can be provided with at least one external sealing lip which engages the internal surface of the end portion of the second conduit. In addition to, or instead of, the external sealing lip or lips, the sealing means can be provided with one or more internal sealing lips which engage the external surface of the first section of the tubular connector.

The sleeve of the biasing means can comprise a radially outwardly extending collar which is adjacent the front end portion of the first section of the tubular connector. Such collar can extend radially outwardly beyond at least a portion of or beyond the entire first section of the connector.

The sleeve of the biasing means can comprise an annulus of deformable elastic prongs which extend in substantial parallelism with the axis of the connector and slots which alternate with the prongs. The prongs are surrounded by the end portion of the first conduit, and such biasing means preferably further comprises a ring which is surrounded by the annulus of prongs and serves to urge the prongs against the internal surface of the end portion of the first conduit. The prongs can be provided with projecting portions which are maintained in deforming engagement with the end portion of the first conduit. The prongs can further comprise substantially radially inwardly extending end portions which are disposed within the confines of the end portion of the first conduit. Such end portions of the prongs can constitute lugs which make oblique angles with the axis of the connector in undeformed condition of the prongs. The ring which urges the projecting portions of the prongs radially outwardly can be provided with projections in the form of ribs which extend into the slots between neighboring prongs. Alternatively, the ring can constitute an elastic split ring which is received in the annulus of prongs in deformed condition so that it tends to expand and thereby urges the prongs against the internal surface of the end portion of the first conduit. Such split ring can be provided with a smooth peripheral surface.

The second section of the tubular connector can be provided with a substantially ring-shaped internal rib which engages the external surface of the end portion of the first conduit. The biasing means of such coupling can comprise a ductile metallic sleeve having a radially expanded portion which is disposed in the end portion of the first conduit and is surrounded by the rib of the second section of the connector.

In accordance with a modification, the biasing means can comprise a metallic sleeve of ductile material provided with a substantially ring-shaped outwardly extending corrugation which engages the end portion of the first conduit from within and urges the end portion of the first conduit against the internal surface of the second section of the connector. The front portion of the second section of the connector can constitute a centering means which extends into the end portion of the second conduit.

If the biasing means comprises a sleeve, the aforementioned collar of such sleeve preferably extends into close proximity of or into actual contact with the internal surface of the end portion of the second conduit. An end face of such collar can abut the front end portion of the first section of the connector. The collar can be replaced by a discrete centering ring which is provided at the front end of the sleeve and abuts the end portion of the second conduit from within adjacent the first section of the connector. An end face of the centering ring preferably abuts the front end portion of the first section of the connector.

In accordance with a modification, the biasing means can comprise a sleeve which is integral with the first section of the connector and is surrounded by the end portion of the second conduit.

The end portion of the second conduit can have a larger-diameter first internal surface adjacent to its open end, a smaller-diameter second internal surface which is distant from the open end, and a substantially radially extending intermediate internal surface between the first and second internal surfaces. The first section of the connector can be provided with an external shoulder which abuts directly the intermediate internal surface of the bent portion of the second conduit. This obviates the need for annular sealing means. In order to ensure more accurate centering of the connector in the end portion of the second conduit, the end portion of the second conduit can be provided with a first frustoconical surface which is disposed between the second internal surface and the intermediate internal surface of the end portion of the second conduit and tapers in a direction away from the first internal surface. The first section of the connector is then provided with a second frustoconical surface which is at least substantially complementary to and is surrounded by the first frustoconical surface.

The end portion of the second conduit can be provided with a substantially radially outwardly extending external stop, and the pallet can be provided with a projection having a first flank which abuts the projection on the end portion of the second conduit and a second flank which abuts the stop. The length of the elongated portion of the pallet can equal or approximate the axial length of the projection on the end portion of the second conduit. The rear end portion of the pallet can be provided with an opening which is in register with the protuberance of the pallet so that a tool which is used to disengage the protuberance of the pallet from the projection of the end portion of the second conduit can be introduced through such opening.

Another feature of the invention resides in the provision of a method of assembling a hose coupling of the type wherein the end portion of a hose extends into the second section of a tubular connector whose first section is inserted into a nipple having an external rib which is engaged by the teeth of elastic pallets provided on the connector and serving to releasably attach the connector to the nipple. The method comprises the steps of inserting into the end portion of the hose a sleeve of ductile material prior to insertion of the first section into the nipple, and introducing into the sleeve a mandrel with a diameter such that the sleeve expands the end portion of the hose to thereby bias the end portion of the hose radially outwardly against the second section of the connector. Such method can further comprise the step of introducing into the end portion of the hose a tubular guide with a window for a spherical or otherwise configurated deforming element so that a portion of the deforming element extends radially inwardly beyond the window. The introducing step then includes advancing the mandrel axially into the guide so that the mandrel moves the deforming element radially outwardly and the deforming element thereby expands the sleeve into deforming engagement with the end portion of the hose. Such method can further comprise the step of rotating the sleeve and the guide relative to each other not earlier than in the course of the advancing step.

The novel features which are considered as characteristic of the invention are set forth in particular in the appended claims. The improved coupling itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 4 is a fragmentary axial sectional view of a modified coupling showing a sleeve of ductile metallic material prior to radial expansion of a portion of the sleeve into deforming engagement with the end portion of the hose;

FIG. 5 shows the structure of FIG. 4 with the portion of the sleeve in expanded condition;

FIG. 6 is a fragmentary axial sectional view of a further coupling with a tubular cage for one or more spherical deforming elements which are about to provide the sleeve with a radially outwardly extending corrugation serving to expand the sleeve into deforming engagement with the end portion of the hose;

FIG. 7 shows the structure of FIG. 6 upon completion corrugating step;

FIG. 8 is an end elevational view of a modified deforming element;

FIG. 9 is a sectional view as seen in the direction of arrows from the line I—I of FIG. 8;

FIG. 10 is a partly elevational and partly axial sectional view of an additional coupling with modified biasing means for the end portion of the hose;

FIG. 13 is an enlarged fragmentary axial sectional view of a third modification of the coupling which is shown in FIG. 10;

FIG. 14 is a smaller-scale elevational view of the coupling of FIG. 13;

FIG. 15 is an enlarged view of a modification of the structure within the phantom-line circle X in FIG. 13.

DESCRIPTION OF THE PREFERRED EMBODIMENTS

Figure 1:
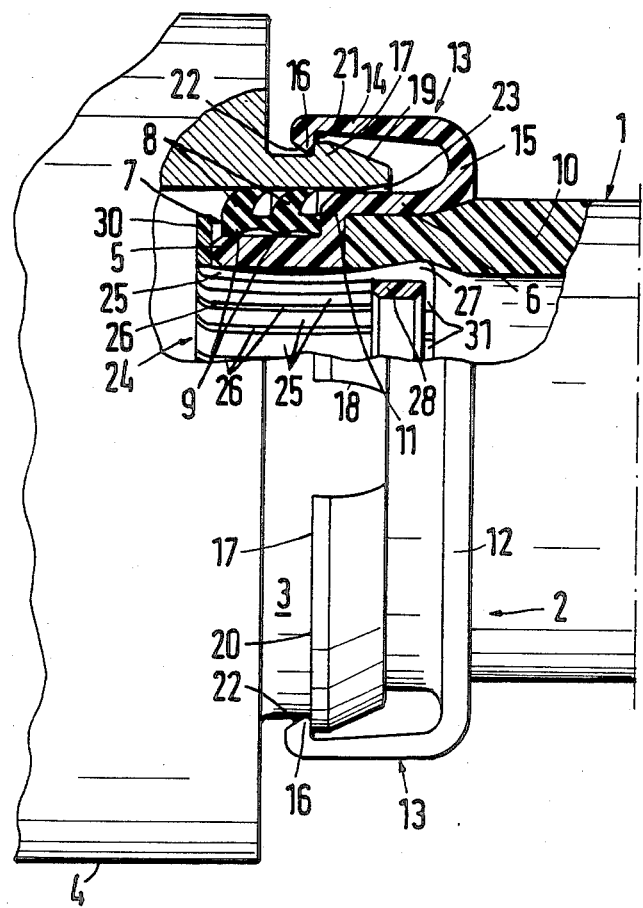
FIG. 1 is a fragmentary partly elevational and partly longitudinal sectional view of a fully assembled hose coupling which embodies one form of the present invention.

FIG. 1 shows a coupling which comprises a first conduit 1 in the form of a hose which is made of a relatively soft thermoplastic material and has an end portion 10 received in the second or rear section 6 of a tubular connector 2. The connector 2 is made of a harder thermoplastic material and its first or front section 5 extends with clearance into the end portion 3 (hereinafter called nipple) of a second conduit 4 which can constitute a portion of a radiator in a motor vehicle or the like. The outer diameter of the front section 5 of the connector 2 is smaller than the inner diameter of the nipple 3, and the front section 5 is surrounded by an elastic annular seal 7 having two internal elastic lips 9 in sealing engagement with the external surface of the section 5 and two external elastic sealing lips 8 in sealing contact with the internal surface of the nipple. The width of the annular space or clearance between the cylindrical external surface of the section 5 and the cylindrical internal surface of the nipple 3 is selected in such a way that the seal 7 undergoes requisite deformation in response to insertion of the connector 2 into the nipple to such an extent that the front portion of the rear section 6 also extends into the nipple. The outer diameter of the rear section 6 of the connector 2 equals or is only slightly less than the inner diameter of the nipple 3. The inner diameter of the section 6 is somewhat less than the outer diameter of the end portion 10 of the hose 1 in undeformed (non-compressed) condition of the end portion 10. The front end face of the end portion 10 abuts an internal shoulder which is provided on an intermediate section 11 of the connector 2 between the sections 5 and 6. Since the end portion 10 is deformed, it tends to remain in sealing engagement with the internal surface of the section 6.

The front end face of the end portion 10 of the hose 1 is preferably rigidly secured, most preferably bonded, to the adjacent shoulder of the intermediate section 11 of the connector 2. To this end, the material of the end porton 10 is heated to a temperature at which it can be welded to the material of the connector 2, or one can employ a suitable adhesive which ensures that the end portion 10 and the intermediate section 11 constitute a rigid one-piece unit. The manner in which the end portion 10 and the section 11 must be heated to the melting point of their respective plastic materials in order to establish a satisfactory bond, and in which such parts are thereupon cooled in order to ensure the establishment of a long-lasting integral connection forms no part of the present invention.

If the bond between the end portion 10 and the section 11 is to be established by an adhesive, the adhesive can constitute a heat-activatable substance, especially if the hose 1 is made of rubber. The heat-activatable substance is applied to the section 11 and/or to the end portion 10 before the end portion 10 is inserted into the rear section 6 of the connector 2, and the parts 10 and 11 are thereupon heated to vulcanization temperature of the rubber.

In accordance with a presently preferred embodiment of the invention, the inner diameter of the front section 5 of the connector 2 exceeds the inner diameter of the end portion 10 when the end portion 10 is in undeformed condition.

The rear end portion 12 of the rear section 6 constitutes a radially outwardly flaring flange which merges gradually into the rear end portions 15 of two mirror symmetrical elastic pawl-pallets or claws 13 of the connector 2. The elongated intermediate portions 14 of the pallets 13 extend in substantial parallelism with the axis of the connector 2, and the front ends of the portions 14 are provided with radially inwardly extending protuberances in the form of teeth 16 having radially extending inner flanks 21 in engagement with the radially extending flank 20 of a circumferentially extending projection or rib 17 at the exterior of the nipple 3. The width of the claws or pallets 13 decreases in a direction from the flange 12 of the rear section 6 toward the conduit 4. Furthermore, the thickness of the intermediate portions 14 of the pallets 13 preferably decreases in a direction from the rear end portions 15 toward the respective teeth 16. Such configuration contributes to flexibility of the intermediate portions 14 and facilitates engagement of the teeth 16 with, and their disengagement from, the flank 20 of the rib 17.

The rib 17 is provided with two axially extending passages or cutouts 18 each of which is wide enough to allow the tooth 16 of a pallet 13 to pass therethrough. The rear flank 19 of the rib 17 slopes gradually from the flank 20 toward the open end of the nipple 3. The purpose of the cutouts 18 is to allow for convenient attachment of the pallets 13 to, as well as their detachment from, the rib 17. All that is necessary is to place the teeth 16 into register with the cutouts 18 and to move the connector 2 axially of the nipple 3 and/or vice versa. Once the rear flanks 21 of the teeth 16 are located to the left of the radial flank 20 of the rib 17, the connector 2 is rotated relative to the nipple 3 and/or vice versa so that the flanks 21 engage the flank 20 and the conduits 1 and 4 are securely coupled to each other. Alternatively, the connector 2 can be attached to the nipple 3 by simply causing the forwardly and outwardly sloping front flanks 22 to slide along the sloping flank 19 of the rib 17 while the connector 2 is moved axially toward the conduit 4. The inclination of the front flanks 22 with reference to the axis of the connector 2 can equal or approximate 30°.

The open end of the nipple 3 is surrounded by a frustoconical internal surface 23 which flares outwardly in a direction away from the major part of the conduit 4 and serves to facilitate introduction and centering of the front portion of the rear section 6 of the connector 2 in the nipple. The inclination of the surface 23 with reference to the axis of the connector 2 can be in the range of 15°. The inclination of the flank 19 relative to the axis of the connector 2 can be approximately 21°.

The coupling of FIG. 1 further comprises means for biasing the end portion 10 of the hose 1 radially outwardly into sealing engagement with the internal surface of the section 6. The biasing means comprises a radially expandable sleeve 24 of synthetic plastic material and a ring 28 which is surrounded by the rightmost portion of the sleeve 24 in the region within the confines of the end portion 10 and rear section 6. The sleeve 24 has axially parallel elongated slots 26 which alternate with axially parallel prongs 25. Each slot 26 extends all the way to the right-hand end face of the sleeve 24. The left-hand end portions of the prongs 25 are integral with a radially outwardly extending collar 30 which extends radially outwardly beyond the external surface of the front section 5. The rear end face of the collar 30 preferably abuts the adjacent end portion of the front section 5. The material of the sleeve 24 is elastic and its prongs 25 tend to pivot radially inwardly. Each such prong has a projecting portion 27 which is biased into the internal surface of the end portion 10 of the hose 1 by the ring 28. The number of prongs 25 in the annulus of such prongs on the collar 30 of the sleeve 24 can be selected practically at will, as long as the number of prongs and their projecting portions 27 suffices to ensure the establishment of a reliable sealing engagement between the external surface of the end portion 10 of the hose 1 and the internal surface of the rear section 6 of the connector 2.

Figure 2:
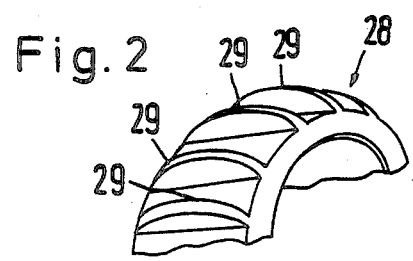
FIG. 2 is a fragmentary perspective view of a ring which can be utilized in the hose coupling of FIG. 1.

FIG. 2 shows one presently preferred embodiment of the ring 28. This ring is formed with radially outwardly extending projections in the form of axially parallel ribs 29 each of which enters one of the slots 26 when the ring 28 is properly installed in the sleeve 24. The projections 29 ensure that the material of the end portion 10 of the hose 1 cannot penetrate into the adjacent right-hand end portions of the respective slots 26. This results in more uniform stressing of the end portion 10 and in more reliable retention in the rear section 6 of the connector 2.

The collar 30 not only facilitates insertion of prongs 25 into the front section 5 and into the end portion 10 but it also constitutes an abutment for the annular seal 7 between the front section 5 and the nipple 3. The length of the prongs 25 is selected in such a way that the projecting portions 27 are located at an optimum distance from the intermediate section 11 when the collar 30 abuts the front end portion of the section 5. The right-hand end portions of the prongs 25 are provided with or constitute radially inwardly extending lugs 31 which determine the extent to which the ring 28 can be inserted into the sleeve 24.

The inclination of prongs 25 in undeformed condition of the sleeve 24 is such that the projecting portions 27 of the prongs form a composite ring having an outer diameter which is less than the inner diameter of the end portion 10 in undeformed condition of the hose 1. This facilitates insertion of the sleeve 24 into the front section 5 and end portion 10. At such time, the lugs 31 of the prongs 25 are located in planes which are not exactly normal to the axis of the connector 2. When the ring 28 is inserted, it pivots the prongs 25 relative to the collar 30 so that the projecting portions 27 move radially outwardly and deform the end portion 10 of the hose with attendant establishment of sealing engagement between the end portion 10 and the rear section 6. The forward movement of the ring 28 is terminated when it reaches the lugs 31 of the prongs 25. FIG. 1 shows that the intermediate portions of the prongs 25 assume an arcuate shape when the ring 28 reaches the lugs 31 and the collar 30 abuts the front end portion of the section 5.

If the end portion 10 of the hose 1 is bonded or glued to the intermediate section 11 of the connector 2, the provision of biasing means 24, 28 constitutes a safety feature which further reduces the likelihood of separation of the hose 1 from the connector 2 when the improved coupling is in actual use. The bond between the end portion 10 and the intermediate section 11 is not always necessary if the coupling is supplied with the biasing means including the sleeve 24 and the ring 28.

Figure 3:
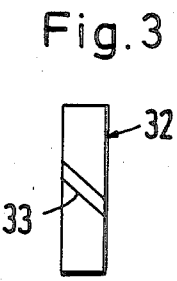
FIG. 3 is an end elevational view of a modified ring.

FIG. 3 shows a modified ring 32 which can be used in lieu of the circumferentially complete ring 28 of the coupling shown in FIG. 1. The ring 32 is a split ring having a slit 33 disposed in a plane which is inclined relative to the axis of the ring 32. Such ring is preferably made of a metallic material, for example, spring steel. The peripheral surface of the ring 32 is smooth. The outer diameter of the ring 32 in undeformed condition of the ring is selected in such a way that the width of the slit 33 must be reduced in order to introduce the ring 32 into the space within the projecting portions 27 of the prongs 25. The properly inserted ring 32 then biases the projecting portions 27 against the end portion 10 of the hose 1 and maintains the end portion 10 in satisfactory sealing engagement with the internal surface of the rear section 6. The ring 32 compensates for eventual loss of elasticity of the end portion 10 and/or for changes in the radial dimensions of the end portion 10 as a result of heating or cooling of the hose 1 and/or rear section 6.

An important advantage of the improved coupling is that the length of that portion (10) of the hose 1 which is introduced into the connector 2 can be reduced to a small fraction of the length of such end portion in a conventional coupling. This is due to the fact that the improved biasing device 24, 28 ensures the establishment of a reliable sealing engagement between the end portion 10 and the rear section 6. The dimensions of the sleeve 24 and ring 28 or 32 can be readily selected in such a way that the assembled coupling can stand pronounced axial stresses which tend to extract the end portion 10 of the hose 1 from the connector 2 and/or which tend to extract the end portion 10 and the connector 2 from the nipple 3. The sealing action between the end portion 10 and the rear section 6 is highly satisfactory. As mentioned above, such sealing action can be enhanced by permanently connecting the front end face of the end portion 10 to the adjacent surface of the intermediate section 11 of the connector 2. If the end portion 10 is bonded to the section 11, the axial length of that part of the end portion 10 which extends into the section 6 and surrounds the projecting portions 27 of the prongs 25 can be reduced still further, the same as the axial length of the rear section 6.

The radial dimensions of the annular space for the seal 7 are selected in such a way that the seal does not offer excessive resistance to its introduction (together with the front section 5 therewithin) into the nipple 3. The illustrated arrangement renders it possible to assemble the coupling by means of a robot which is particularly important in fully automated assembly plants for motor vehicles and the like. As mentioned above, the nipple 3 can form part of a radiator in a motor vehicle and such radiator can be provided with two or more nipples each of which is connectable with a discrete hose in a manner as shown in FIG. 1.

The reliability of the improved coupling is enhanced due to the fact that the rear end portions 15 of the pallets 13 are integral with the flange 12 at the rear end of the rear section 6. It has been found that such attachment of pallets 13 to the rear section 6 contributes to the establishment of a more reliable connection between the teeth 16 and the rib 17. Such connection can stand very pronounced axial stresses. The bond between the end portion 10 and the intermediate section 11 can also be selected with a view to increase the resistance which the coupling offers to axial stresses tending to extract the end portion 10 from the connector 2. It is clear that, if the bond is established by an adhesive, the adhesive need not be of the thermally activatible type. This obviates the need for a heating of the end portion 10 and intermediate section 11 to a temperature at which a heat-activatable adhesive is capable of bonding the parts 10 and 11 to each other. The establishment of integral connections between the rear end portions 15 of the pallets 13 and the flange 12 of the connector section 6 is desirable on the additional ground that this allows for the making of relatively long intermediate portions 14. The elasticity of such relatively long portions 14 is sufficiently pronounced to permit ready flexing of the pallets 13 during attachment of the connector 2 to the nipple 3, namely during pivoting of the portions 14 relative to the flange 12 as a result of sliding movement of the teeth 16 along the rearwardly and inwardly sloping flank 19 of the rib 17. Each of the pallets 13 can be said to constitute an elongated lever one end portion (15) of which is integral with the flange 12 and the other end portion of which carries the respective tooth 16. Each end portion 15 preferably includes a radially outwardly extending rearmost part which is integral with the flange 12 and an arcuate part which merges into the rearmost part of the intermediate portion 14 of the respective pallet. Arcuate rear end portions 15 facilitate the introduction of the end portion 10 of the hose 1 into the rear section 6 on the connector 2. Moreover, the arcuate rear end portions 15 can constitute abutments or stops for the adjacent portions of the hose 1 when the hose is flexed adjacent to the flange 12 so that its external surface abuts the end portion 15 of the one or the other pallet 13. It has been found that such configuration of the pallets 13 enables the connector 2 and the end portion 10 of the hose 1 to stand substantial vibratory and/or other stray movements which take place when the improved coupling is used in a motor vehicle. Arcuate rear end portions 15 of the pallets 13 further enhance the ability of such pallets to stand pronounced bending stresses in regions where the pallets merge into the flange 12 of the rear section 6 of the connector 2. Such flexing takes place whenever the teeth 16 slide over the flank 19 of the rib 17 in a direction to engage the flank 20.

The utilization of pallets which taper forwardly in the radial and/or circumferential direction of the connector 2 not only entails substantial savings in material but also enhances the elasticity of the intermediate portions 14 and the facility with which the teeth 16 can engage, or can be disengaged from, the flank 20 of the rib 17 on the nipple 3. Such configuration of the pallets 13 does not adversely affect the strength of the rear end portions 15 which merge into the flange 12 of the section 6.

The feature that the inner diameter of the section 5 exceeds the inner diameter of the end portion 10 in undeformed condition of the hose 1 contributes to a more satisfactory sealing action between the end portion 10 and the section 6 when the end portion 10 is expanded by the prongs 25 of the sleeve 24.

The configuration of the rib 17 can deviate from the illustrated configuration. However the illustrated configuration is preferred at this time because the rib can be shaped in a simple and inexpensive way. Furthermore, the gradually sloping flank 19 of the rib 17 facilitates the movement of the teeth 16 toward and into engagement with the radial flank 20.

The lips 8 and/or 9 on the seal 7 are optional but desirable and advantageous. The provision of such lips simplifies the mounting of the seal 7 on the front section 5 and the insertion of the section 5 and front portion of the rear section 6 into the nipple 3 during assembly of the coupling.

Flexing of median portions of the prongs 25 upon completed insertion of the ring 28 is desirable and advantageous because the inwardly bulging portions of the prongs prevent accidental shifting of the ring 28 in a direction away from the lugs 31.

FIGS. 4 and 5 illustrate a modified coupling wherein the rear section 6' of the connector 2a has a circumferentially complete or interrupted internal rib 34 which engages the external surface of the end portion 10 of the hose 1. Furthermore, the biasing means of the coupling which is shown in FIGS. 4 and 5 comprises a one-piece sleeve 24a of ductile metallic material. This sleeve is not formed with any slots or with otherwise configurated cutouts. Its left-hand end portion extends radially outwardly and constitutes a collar 30 which serves as an abutment for the front end portion of the front section 5 as well as a stop against excessive leftward movement of the annular seal 7.

When the sleeve 24a is inserted into the front section 5 and end portion 10, it comprises a larger-diameter rear end portion 35 which is adjacent to the collar 30, a smaller diameter end front portion 36 which is surrounded by the end portion 10 of the hose 1, and a frustoconical intermediate portion 37 which slopes radially inwardly in a direction from the portion 35 toward portion 36. The outer diameter of the portion 35 equals or is only slightly less than the inner diameter of the front section 5, and the outer diameter of the portion 36 can equal or is only slightly less than the inner diameter of the end portion 10. The dimensions of the portion 36 are preferably selected in such a way that the distance between its outer surface and the radially innermost portion of the internal rib 34 on the section 6' equals or approximates the thickness of the end portion 10. This renders it possible to readily introduce the end portion 10 into the annular space between the rib 34 and the portion 36 of the sleeve 24a. However, it is equally possible to first introduce the end portion 10 into the rear section 6' of the connector 2a and to thereupon insert the sleeve 24a in a manner as shown in FIG. 4. In the next step, a cylindrical mandrel 38 is introduced into the portion 35 of the sleeve 24a and is moved from the position of FIG. 4 toward the position of FIG. 5. The diameter of the mandrel 38 equals or approximates the inner diameter of the rear end portion 35 so that the mandrel expands the intermediate portion 37 as well as the front end portion 36 of the sleeve 24a in such a way that the sleeve ultimately assumes the shape of a cylinder having a constant diameter and provided with the collar 30 at its left-hand end. This results in appreciable deformation of the end portion 10 so that the rib 34 of the section 6' defines in the external surface of the end portion 10 a circumferentially complete or interrupted depression and the internal surface of the end portion 10 is in pronounced sealing engagement with the external surface of the expanded part of the sleeve 24a. Since the material of the sleeve 24a is ductile, the configuration of the expanded sleeve 24a remains unchanged after the mandrel 38 is extracted preparatory to attachment of the connector 2a to the rib 17 of the nipple 3, not shown in FIGS. 4 and 5. The mandrel 38 may but need not be made of the same relatively hard synthetic plastic material as the connector 2a.

Though FIGS. 4 and 5 do not show a bond between the front end face of the end portion 10 of the hose 1 and the intermediate section of the connector 2a, such bond can be established in a manner as described in connection with FIG. 1, namely by welding the end portion 10 to the connector 2a or by utilizing a suitable heat-activatable or other adhesive.

An advantage of the coupling which is shown in FIGS. 4 and 5 is that its biasing means is simpler than the biasing means 24, 28 of the coupling which is shown in FIG. 1. If desired, the sleeve 24a of FIGS. 4 and 5 can be modified by providing it with longitudinally extending slots in the intermediate portion 37 and in the adjacent part of the end portion 36. The provision of such slots facilitates radial expansion of the portions 36, 37 in response to introduction of the mandrel 38.

Another advantage of the sleeve 24a of FIGS. 4 and 5 is that the dimensions of its portions 37 and 36 can be readily selected in such a way that the sleeve can be introduced into the front section 5 and into the end portion 10 of the hose 1 with the exertion of a negligible effort. The internal rib 34 is capable of cooperating with the expanded portions 36, 37 of the sleeve 24a to stand pronounced axial stresses which tend to extract the end portion 10 from the space between the rear section 6' of the connector 2a and the expanded sleeve 24a.

It is not absolutely necessary to expand the portions 36 and 37 to the extent as shown in FIG. 5. It suffices to ensure that the expansion of the portion 37 and/or 36 guarantees a reliable retention of the end portion 10 within the confines of the rear section 6' of the connector 2a.

FIGS. 6 and 7 illustrate a portion of a third coupling wherein the biasing means again comprises a one-piece sleeve 24b of ductile metallic material. The left-hand end portion 30 of the sleeve 24b constitutes a radially outwardly extending collar which abuts the adjacent end portion of the front section 5 and constitutes a stop against excessive leftward axial movement of the seal 7. The major part of the sleeve 24b constitutes a cylinder before the sleeve is introduced into the front section 5 of the connector 2 and into the end portion 10 of the hose 1. The difference between the embodiments of FIGS. 4-5 and 6-7 is that the deformation of an intermediate portion of the sleeve 24b necessitates the utilization of a modified mandrel 42 and an additional component in the form of a tubular guide or cage 39 having at least one radially extending window 40 for a spherical deforming element 41. The diameter of the deforming element 41 is selected in such a way that it exceeds the thickness of the cage 39 so that a portion of the deforming element 41 extends radially inwardly beyond the internal surface of the cage when the latter is properly inserted into the cylindrical part of the sleeve 24b. The outer diameter of the cylindrical part of the sleeve 24b upon insertion of the sleeve into the front section 5 and end portion 10 equals or approximates the inner diameter of the front section 5. The wall thickness of the cylindrical part of the sleeve 24b can be a small fraction of the thickness of the section 5 and/or 6 of the tubular connector 2. Furthermore, the wall thickness of the cylindrical part of the sleeve 24b can be a very small fraction of the thickness of the cylindrical part of the tubular cage 39. The outer diameter of the cylindrical part of the cage 39 can approximate, or is only slightly less than, the inner diameter of the sleeve 24b. This cage can be provided with a set of two, three, four or more preferably equidistant openings or windows 40 each of which receives a discrete spherical deforming element 41. The front (left-hand) end portion 47 of the guide of cage 39 can constitute a disc-shaped end wall or a washer-like body which serves as a stop for the smaller-diameter front end portion 43 of the mandrel 42. The major part 44 of the mandrel 42 constitutes a cylinder having a diameter which equals or is only slightly less than the inner diameter of the cage 39. This ensures that, when the mandrel 42 is introduced into the cage 39 and its front end portion 43 advances beyond the deforming elements 41, the larger-diameter part 44 of the mandrel 42 moves the deforming elements 41 radially outwardly and causes them to deform the adjacent portions of the sleeve 24b. In the next step, the mandrel 42 and/or the cage 39 is rotated about the axis of the sleeve 24b so as to convert the individual protuberances, formed by the deforming elements 41, into a circumferentially complete or into an interrupted corrugation 46 which is shown in FIG. 7. Such corrugation deforms the adjacent portion of the hose 1 so that the end portion 10 is held in proper sealing engagement with the external surface of the adjacent portion of the sleeve 24b as well as with the internal surface of the rear section 6 of the tubular connector 2.

The diameters of the deforming elements 41 and the wall thickness of the cage 39 will determine the dimensions of the corrugation or corrugations 46 in the cylindrical part of the sleeve 24b. The diameter of the front end portion 43 of the mandrel 42 is preferably selected in such a way that it is smaller than the outer diameter of the cylindrical part of the cage 39 by at least the diameter of a spherical deforming element 41.

The mode of assembling the coupling of FIGS. 6 and 7 is as follows: In the first step, the seal 7 is slipped onto the front section 5 of the connector 2, and the end portion 10 of the hose 1 is slipped into the rear section 6. Such insertion of the end portion 10 into the rear section 6 can take place before or subsequent to introduction of the cylindrical part of the sleeve 24b into the front section 5 and end portion 10. The next step involves the advancement of the cage 39 to the position which is shown in FIG. 6 whereby the deforming elements 41 extend into the interior of the cylindrical part of the cage and do not interfere with convenient insertion of the cage into the cylindrical part of the sleeve 24b and further on into the interior of the hose 1. The next step involves insertion of the mandrel 42 in a manner as shown in FIG. 6 so that the front end portion 43 is surrounded by the spherical deforming element or elements 41. As the mandrel 42 continues to advance toward the end wall 47 of the cage 39, its part 44 moves the spherical deforming element or elements 41 radially outwardly and causes such elements to deform the adjacent portions of the sleeve 24b. As mentioned above, the final step involves rotation of the cage 39 relative to the sleeve 24b and/or vice versa so that the sleeve is formed with a continuous or composite corrugation 46. The direction of introduction of the mandrel 42 into the cage 39 is indicated by the arrow 45. The cage 39 can be rotated relative to the sleeve 24b during or subsequent to advancement of the mandrel 42 toward the right-hand end position of FIG. 7.

The mandrel 42 is thereupon extracted by moving counter to the direction which is indicated by the arrow 45 so that the deforming element or elements 41 can move radially inwardly as soon as they surround the smaller-diameter front end portion 43 of the mandrel. The cage 39 and the mandrel 42 are thereupon extracted as a unit so as to ensure that the deforming elements 41 cannot leave their respective windows 40. In other words, the mandrel 42 need not be extracted from the cage 39 (in a direction to the left) beyond the position which is shown in FIG. 6. The mandrel 42 can be fully extracted from the cage 39 if the latter is provided with suitable prongs or claws which permit a certain radial movement of the deforming elements 41 in their windows 40 but prevent the escape of entire deforming elements from their respective windows.

If desired, the stability of the coupling which is shown in FIGS. 6 and 7 can be enhanced still further by bonding the front end face of the end portion 10 of the hose 1 to the intermediate section of the connector 2.

The spherical deforming elements 41 of FIGS. 6 and 7 can be replaced with otherwise configurated deforming elements without departing from the spirit of the invention. For example, FIGS. 8 and 9 show a modified deforming element 41' which resembles a portion of a ring with a curvature matching or approximating the curvature of the peripheral surface of the median part 44 of the mandrel 42. Each of the deforming elements 41' has two parallel lateral surfaces which can fit, with a certain amount of play, into the respective window of the cage (not shown in FIGS. 8 and 9).

An advantage of the deforming elements 41' is that they are in substantial surface-to-surface contact with the part 44 of the mandrel 42 when the mandrel is moved toward the axial position corresponding to that of FIG. 7. This reduces the pressure per unit area of those surfaces of the deforming elements 41' and mandrel 42 which are in contact with each other while the deforming elements are in the process of deforming the adjacent portions of the sleeve 24b. A suitable lubricant can be introduced between the concave surfaces of the deforming elements 41' and the external surface of the part 44 of the mandrel 42. This facilitates insertion of the mandrel 42 into the cage 39. The radial dimension of each deforming element 41' can match or approximate the diameter of the spherical deforming element 41 which is shown in FIGS. 6 and 7. The windows for reception of deforming elements 41' need not have a circular shape. Preferably, such windows have a polygonal shape so as to ensure more predictable guidance of the deforming elements 41' in the radial direction of the respective cage.

The manner in which the pallets 13 of the couplings which are shown in FIGS. 4–5 and 6–7 engage or are disengaged from the rib 17 of the nipple 3 (not shown in FIGS. 4–7) is the same as described in connection with FIG. 1. If the rib 17 is not provided with cutouts 18 (or if the operator does not want to take advantage of such cutouts) the front section 5 (with the seal 7 thereon) is pushed into the nipple 3 whereby the teeth 16 of the pallets 13 slide along the frustoconical flank 19 of the rib 17 and ultimately snap over and into engagement with the radial flank 20 due to innate elasticity of the pallets. The outwardly flaring frustoconical internal surface 23 of the nipple 3 facilitates the introduction of the connector 2 or 2a and of the seal 7 into the interior of the nipple and reliable engagement of the tips of teeth 16 with the flank 19 of the rib 17. The movement of the teeth 16 radially outwardly during advancement of the connector 2 into the nipple 3 does not necessitate the exertion of a substantial force due to the aforementioned radial and circumferential taper of the intermediate portions 14 of the pallets 13 and due to the fact that the lever arms of the pallets 13 are relatively long because the arcuate end portions 15 of the pallets are integral with the flange 12 at the rear end of the section 6 or 6' of the connector. The front flanks 22 of the teeth 16 also facilitate proper advancement of the teeth toward and into engagement with and along the flank 19 of the rib 17 on the nipple 3.

If the operator thereupon wishes to disengage the connector 2 or 2a from the nipple 3, the connector or the nipple is moved to an angular position in which each tooth 16 registers with a cutout 18 of the rib 17. The extraction of the front section 5 from the interior of the nipple 3 is then opposed only by the outer lips 8 of the seal 7. The arrangement may be such that, when the rib 17 is properly engaged by the teeth 16, each of the two teeth 16 is located substantially midway between the two cutouts 18 in the ribs 17. However, it is equally possible to provide the ribs 17 with four or even more cutouts so that a relatively small angular displacement of the connector and the nipple relative to each other suffices to move each of the teeth 16 into register with one of the cutouts 18.

If it is not readily possible to rotate the connector 2 or 2a relative to the nipple 3, the person in charge may employ the working end of a screwdriver or another suitable tool to move the teeth 16 of the two pallets 13 radially outwardly and away from engagement with the flank 20 of the rib 17 so as to allow for axial shifting of the connector away from the conduit 4 and for resulting separation of the two halves of the coupling.

As mentioned above, it is also possible to assemble the two halves of the coupling without causing any radially outward movement of the teeth 16 away from the section 5 of the connector. All that is necessary is to align each tooth 16 with one of the cutouts 18 and to thereupon advance the connector in a direction toward the conduit 4 so that the teeth 16 move to the left beyond the flank 20 before the connector is rotated relative to the nipple in order to move the radially extending flanks 21 of the teeth 16 into engagement with the flank 20 of the rib 17. Such mode of attaching the hose 1 to the conduit 4 is advantageous when the material of the hose 1 is readily deformable so that the end portion 10 can be twisted relative to the adjacent portion of the hose in order to move each tooth 16 into register with one of the cutouts 18.

Each embodiment of the improved coupling exhibits the advantage that the outer diameter of the end portion 10 of the hose 1 need not be selected with a high degree of accuracy. This is due to the fact that the end portion 10 of the hose 1 need not be surrounded by a metallic clamp or hoop in a manner as known from many conventional hose couplings. The absence of any need for accurate calibration of the end portion 10 of the hose 1 contributes to simplicity and lower cost of the coupling. All that is necessary is to dimension the end portion 10 in such a way that it can be readily introduced into the rear section 6 or 6' of the connector 2 or 2a.

An additional advantage of the improved coupling is that it is not necessary to highly accurately calibrate the nipple 3 and/or the rear section 6 or 6' of the connector. The rear section 6 or 6' can be received in the nipple 3 with a smaller or larger amount of play without affecting the quality of the connection when the coupling is fully assembled. Any clearances between the rear section 6 or 6' on the one hand and the internal surface of the adjacent portion of the nipple 3 on the other hand are fully compensated for by the seal 7 in the annular space between the external surface of the front section 5 and the internal surface of the adjacent portion of the nipple.

FIG. 10 shows a further coupling wherein the nipple 3a of the conduit 4 (for example, a portion of a radiator in a motor vehicle) is shorter than the nipple 3 of FIG. 1. Furthermore, the outer diameter of the collar 30a at the left-hand axial end of the sleeve 24c of the biasing means equals or approximates the inner diameter of the nipple 3a and the adjacent portion of the conduit 4. The right-hand end face of the collar 30a abuts the adjacent lip 8 of the seal 7, the adjacent lip 9 of the seal 7, as well as the adjacent front end portion of the front section 5 of the connector 2. The left-hand end portion of the front section 5 of the connector 2 of FIG. 10 may but need not have a rounded outline as shown for the section 5 of FIG. 1. The front portion of the rear section 6 (in the region of the intermediate section 11) fits rather snugly into the adjacent portion of the internal surface of the nipple 3a. This, combined with the feature that the collar 30a abuts the internal surface of the conduit 4, reduces the likelihood of wobbling of the connector 2 in the interior of the nipple 3a and conduit 4.

The conduit 4 or the nipple 3a is provided with an abutment or stop 48' in the form of a radially outwardly extending surface which is spaced apart from the radial flank 20 of the rib 17 so that the radially outwardly and forwardly sloping front flanks 22 of the teeth 16 abut the stop 48' in fully assembled condition of the coupling which is shown in FIG. 10. The stop 48' contributes to a further reduction of the likelihood of wobbling of the connector 2 on the nipple 3a. Such wobbling is prevented, or its likelihood is greatly reduced, even if the front portion of the section 6 and/or the collar 30a is received in the conduit 4 and nipple 3a with a certain amount of radial play. Prevention of wobbling of the connector 2 is desirable and advantageous because this reduces the likelihood of jamming or wedging of the connector in a position from which it cannot be readily moved in a direction to separate the hose 1 from the conduit 4 and also because the absence of wobbling reduces the likelihood of rapid and pronounced wear upon the seal 7. These features contribute to a more satisfactory sealing action and to longer useful life of the improved coupling.

Figure 11:
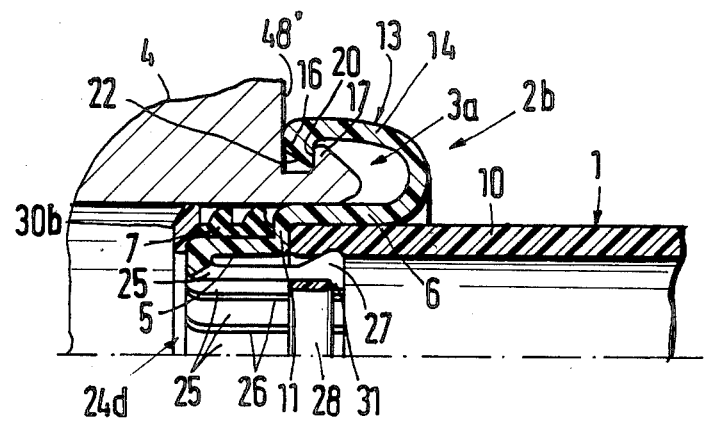
FIG. 11 is a fragmentary axial sectional view of a first modification of the coupling which is shown in FIG. 10.

FIG. 11 illustrates a first modification of the coupling which is shown in FIG. 10. The reference character 30b denotes a discrete centering ring which replaces the collar 30 or 30a and is a separately produced part fitted onto the left-hand end portion of the front section 5 of the tubular connector 2b. The rear section 6 of the connector 2b is or can be identical with the rear section 6 of the connector 2 which is shown in FIG. 1. The sleeve 24d of the biasing means for the end portion 10 of the hose 1 is integral with the front end portion of the front section 5 of the connector 2b. The centering ring 30b can be bonded to the adjacent end portion of the front section 5. The same applies for the collar 30a of the sleeve 24c which is shown in FIG. 10, i.e., the collar 30a can be produced as a separate part and can be bonded or adhesively secured to the adjacent end portion of the sleeve 24c.

Figure 12:
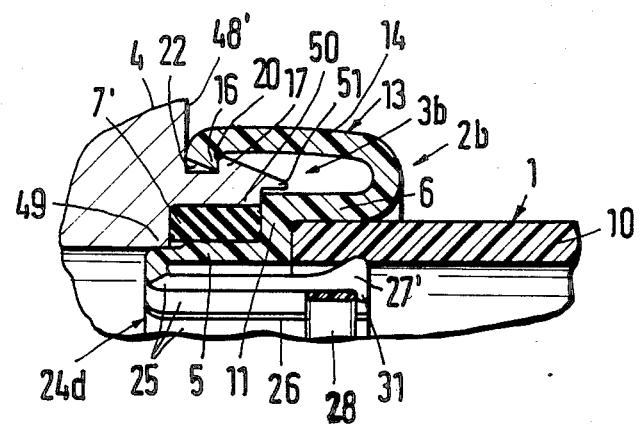
FIG. 12 is a fragmentary axial sectional view of a second modification of the coupling which is shown in FIG. 10.

The coupling of FIG. 12 is similar to the coupling of FIG. 11 in that the sleeve 24d of the biasing means for the end portion 10 of the hose 1 constitutes an integral part of the front section 5 of the tubular connector 2b. The centering ring 30b of FIG. 11 is omitted. The internal surface of the nipple 3b of the conduit 4 which is shown in FIG. 12 has a smaller-diameter portion 49 which surrounds the left-hand end portion of the section 5, and a larger-diameter portion 50 which surrounds an elastic seal 7'. This seal does not have any, or does not have any pronounced, internal and/or external sealing lips. The left-hand end portion of the rear section 6 of the tubular connector 2b is received in the maximum-diameter portion 51 of the internal surface of the nipple 3b. The seal 7' is adequately compressed and deformed so that it is in sealing engagement with the front section 5 and with the nipple 3b when the teeth 16 of the pallets 13 (only one shown) engage the radial flank 20 of the rib 17 and simultaneously abut the stop 48' of the conduit 4.

The coupling of FIG. 12 exhibits the advantage that it comprises a minimal number of parts, namely only the two conduits, the connector 2b and the rather simple seal 7'. Nevertheless, the connector 2b is held against tilting or other stray movements at four spaced apart locations, namely in the region of the smallest-diameter portion 49 of the internal surface of the nipple 3b, in the region of the maximum-diameter portion 51 of the internal surface of the nipple 3b, in the region of the flank 20, and in the region of the stop 48'.

Each of the embodiments which are shown in FIGS. 10, 11 and 12 exhibits the important advantage that the seal 7 or 7' is protected against excessive and rapid wear due to the absence of wobbling of the connector relative to the nipple. Wobbling of the connector would be likely to take place in response to unavoidable and frequent flexing of the hose 1 and/or other stray movements of the conduit 4 and/or hose when the coupling is in actual use, for example, in a motor vehicle. The absence of wobbling considerably reduces the likelihood of leakage of confined fluid in the region of the connector between the conduit 4 and the hose 1.

The structure of FIG. 11 exhibits the advantage that the centering ring 30b can be manufactured at a lower cost than a rather complex sleeve wherein the collar is integral with the prongs and the collar must fit rather snugly into the nipple or the adjacent portion of the conduit 4.

The provision of stops 48' is desirable and advantageous because such stops determine the axial length of the annular clearance of space for the seal 7 or 7'.

The making of the sleeve as an integral part of the connector is desirable and advantageous because this greatly reduces the total number of component parts and reduces the cost of storing spare parts for the coupling.

Regardless of whether or not the sleeve is integral with the connector, the making of the connector in a suitable form for the production of synthetic plastic articles presents no problems. One of the reasons is that the external surface of the front section 5 of the connector need not be provided with one or more circumferentially extending grooves for the seal or seals. This eliminates problems in connection with withdrawal of finished connectors from the cavity of a mold or an extruder.

FIGS. 13 and 14 show a further coupling wherein the tubular connector 2c has three equidistant pallets or claws 13' each of which is integral with the flange 12 at the rear end of the section 6. In contrast to the previously described embodiments, the thickness (as measured radially of the section 6) of the elongated intermediate portions 14' of the pallets 13' is constant. This can be readily seen in FIG. 13. Furthermore, the rear end portions 15' of the pallets 13' do not have an arcuate shape as shown in FIG. 1. Instead, they are rather straight and extend slightly forwardly and radially outwardly from the flange 12 at the rear end of the section 6. This simplifies the design of the mold cavity in which the connector 2c of FIGS. 13 and 14 is formed. The rear end portion 15' of each pallet 13' has an opening 52 which is in line with the respective tooth 16. As can be seen in FIG. 14, the width of each opening 51 (as measured in the circumferential direction of the connector 2c) equals or approximates the corresponding dimension of the registering tooth 16. The purpose of the openings 52 is to allow for insertion of projections in the mold in which the connector 2c is formed. Such projections extend forwardly toward the mold portions which receive material to form the teeth 16. The just mentioned projections are withdrawn through the respective openings 52 when the setting of the material of the connector 2c is completed and the connector is to be extracted or expelled from the mold cavity.

In contrast to the embodiments which are shown in FIGS. 11 and 12, the sleeve 24e of the biasing means for the front end portion of the hose (not shown in FIGS. 13 and 14) is integral with the intermediate section 11 of the connector 2c. When the prongs 25' of the sleeve 24e are not stressed (moved radially outwardly to the broken-line positions of FIG. 13), they define an annulus having a cylindrical external surface of constant diameter extending all the way to the respective lugs 31 and a frustoconical internal surface which tapers in a direction from the section 11 toward the lugs 31.

When the end portion 10 of a hose 1 is introduced between the rear section 6 and the outer surfaces of the prongs 25', a robot or an operator inserts the ring 28 so as to pivot the prongs 25' in the region adjacent the intermediate section 11 of the connector 2c. This causes the projecting portions 27 of the prongs 25' to engage and firmly hold the end portion 10 of the hose and to simultaneously urge the external surface of the end portion 10 against the internal surface of the section 6. In view of the taper of the prongs 25', the projecting portions 27 need not extend beyond the external surfaces of the major portions of the respective prongs. This simplifies the making of the connector 2c in one piece with the sleeve 24e including the prongs 25' and facilitates the extraction of the finished product from the cavity of the machine in which the connector is made.

The configuration of the nipple 3c is similar to that of the nipple 3b in FIG. 12. The nipple 3c comprises a smaller-diameter portion with internal surface 49 which surrounds the foremost portion of the front section 5, and a portion with an internal surface corresponding to the internal surface 50 of the nipple 3b and having an inner diameter slightly exceeding the outer diameter of the rear section 6. The space between the two internal surfaces of the nipple 3c serves for reception of a seal which can be of the type as shown at 7' in FIG. 12. However, such clearance can also receive a seal 7 with internal and/or external sealing lips.

The rib 17' of the nipple 3c is longer than the rib 17 of the nipple 3b of FIG. 12. As shown in FIG. 13, the rib 17' extends close to the rear end portion 15' of the illustrated pallet 13'. This ensures that the connector 2c has a very limited freedom or no freedom of axial and/or radial movement relative to the nipple 3c when the coupling of FIGS. 13 and 14 is in actual use. The absence of any, or the absence of pronounced, stray movements of the connector 2c relative to the nipple 3c reduces the likelihood of extensive and rapid wear upon the seal which is inserted between the front section 5 and the left-hand portion of the nipple 3c.

FIG. 15 shows a portion of a modified coupling, and more specifically a modification of the structure which is shown within the phantom-line circle X in FIG. 13. In this embodiment, the nipple 3c has a larger-diameter internal surface 50, a smaller-diameter internal surface 49, and a frustoconical surface 49a which is disposed between the internal surfaces 49 and 50. The frustoconical internal surface 49a is complementary to a frustoconical external surface at left-hand end of the section 5 of the connector 2d. The taper of the frustoconical surfaces which are shown in FIG. 15 can equal or approximate 15°. The two frustoconical surfaces ensure adequate centering of the connector 2d in the nipple 3c.

The mean diameter of the internal frustoconical surface 49a in the nipple 3c equals or approximates the mean diameter of the external frustoconical surface on the section 5.

Figure 16:
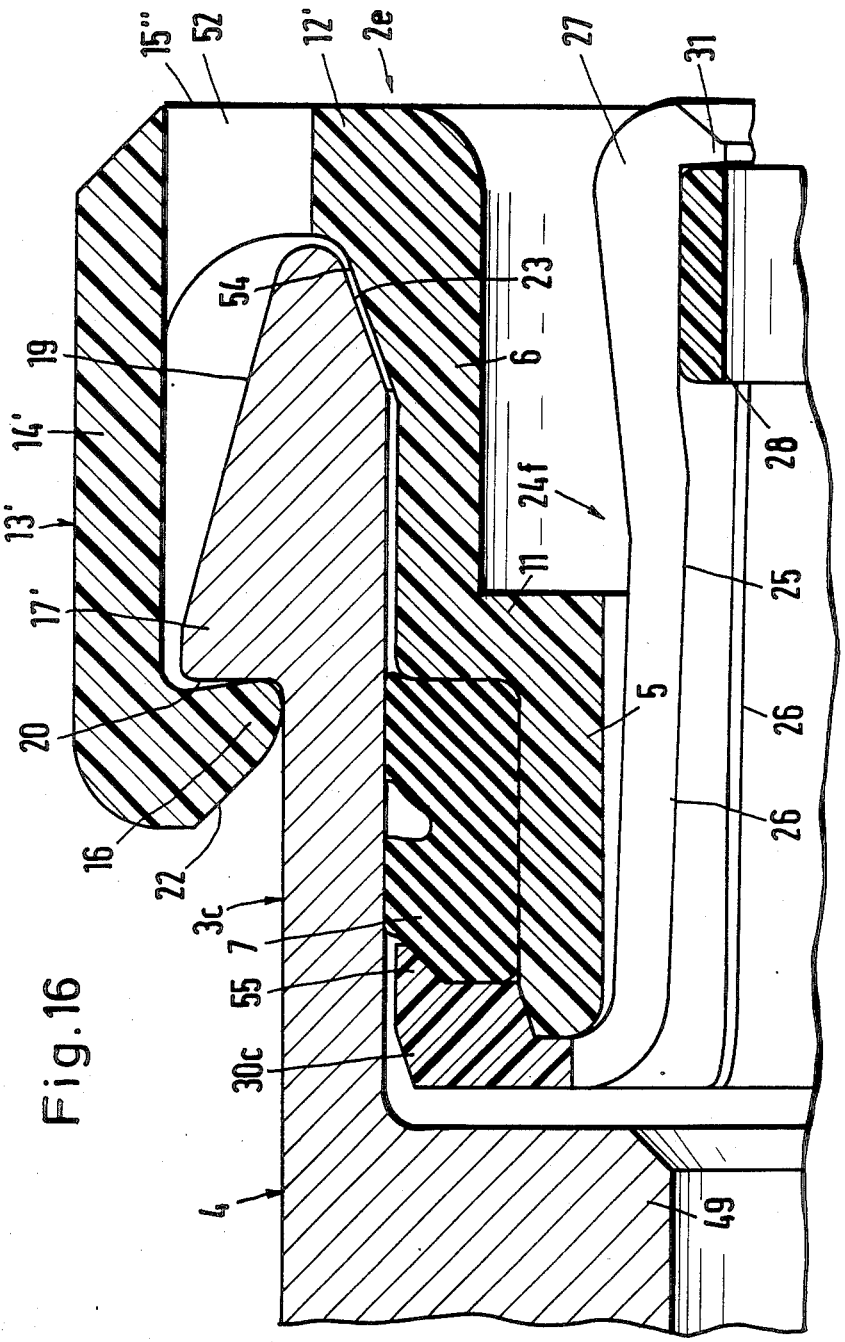
FIG. 16 is an enlarged fragmentary axial sectional view of a further modification of the coupling of FIG. 10.

Referring finally to FIG. 16, there is shown a coupling which constitutes a modification of the coupling of FIGS. 13 and 14. The biasing means of this coupling comprises a modified sleeve 24f having an integral collar 30c which extends radially outwardly beyond the front end portion of the section 5 of the tubular connector 2e and has a bead 55 surrounding the radially outermost portion of the foremost part of the seal 7. The diameter of the collar 30c is slightly less than the inner diameter of the nipple 3c. The frustoconical internal surface 23 at the open end of the nipple 3c is complementary to a frustoconical external surface 54 of the rear end portion or flange 12' of the connector 2e. The rear end portion 15" of the pallet 13' extends substantially radially outwardly and is integral with the flange 12'. The end portion 15" has an opening 52 in register with the tooth 16 at the front end of the intermediate portion 14' of the pallet 13'. The length of the rib 17' on the nipple 3c equals or closely approximates the length of the intermediate portion 14' of the pallet 13'. The area of contact between the frustoconical surfaces 23 and 54 is preferably large so as to greatly reduce the ability of the connector 2e to perform stray movements relative to the nipple 3c. Furthermore, this enlarges the cross-sectional area of the flange 12' and of the rear end portion 15" of the illustrated pallet 13' so that the pallet can stand more pronounced flexing stresses. Still further, such design of the connector 2e and of its pallets 13' enables the connector to stand greater axial stresses which tend to separate it from the nipple 3c.

The configuration of the sleeve 24f is analogous to that of the sleeve 24c which is shown in FIG. 10. The main difference is the provision of the aforementioned bead 55 on the radially outermost portion of the collar 30c.

The illustrated couplings are suscepticle of many additional modifications. For example, the pallets 13,13' and their end portions 15, 15', 15" can be made of a metallic material and can be connected to a ring which is made of spring steel or a similar metallic material and is inserted into an external circumferential groove in the flange 12, or 12' of the plastic connector 2,2a, . . . 2e during the making of the connector in an injection molding or like machine. The making of pallets as integral parts of a ring which is thereupon embedded in the material of the flange of the connector exhibits the advantage that the pallets can stand even higher deforming (particularly bending or flexing) stresses when the coupling which employs such a composite connector-pallet combination is put to use. In many instances, the making of pallets from a synthetic plastic material suffices to ensure reliable retention of the connector in an optimum position relative to the nipple.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:
1. A coupling for use with a first conduit including a deformable first end portion having an external surface and a second conduit having a second end portion with an external porjection, the coupling comprises a tubular connector having a first section extending into said second end portion and a second section having an internal surface arranged to surround the external surface of the first end portion; at least one resilient pallet provided on said connector and releasably engaging said projection to hold said first section against extraction from said second end portion; and means for biasing the first end portion from within so as to maintain the external surface in engagement with said internal surface, said biasing means comprising an annulus of deformable elastic prongs and slots alternating with said prongs, said prongs being surrounded by and having projecting portions in deforming engagement with the first end portion when the external surface of the first end portion is surrounded by said internal surface, said biasing means further comprising a ring surrounded by said annulus and arranged to urge said prongs against the first end portion.

2. The coupling of claim 1, further comprising annular sealing means interposed between said second end portion and said first section.

3. The coupling of claim 1, wherein said biasing means further includes a radially expandible sleeve which is confined in said first end portion in radially expanded condition.

4. The coupling of claim 1, wherein first section and said second end portion define an annular space and further comprising annular sealing means in said space, said pallet being integral with the second section of said connector.

5. The coupling of claim 1, wherein said first section is rigidly secured to said first end portion.

6. The coupling of claim 4, wherein said first end portion is bonded to the first section.

7. The coupling of claim 6, wherein said first end portion and said first section contain thermoplastic material.

8. The coupling of claim 6, wherein said first section is secured to the first end portion by an adhesive.

9. The coupling of claim 1, wherein said first end portion is receivable in the second section in radially compressed condition.

10. The coupling of claim 1, wherein said second section has an end portion which is remote from said first section and is integral with said pallet.

11. The coupling of claim 10, wherein said pallet includes an arcuate portion which is integral with the end portion of said second section and a second portion extending in substantial parallelism with the axis of said connector and having and end portion provided with a protuberance engaging said projection.

12. The coupling of claim 10, wherein said end portion of said second section includes an annular flange flaring radially outwardly away from the first end portion when said internal surface surrounds the external surface of the first end portion, said pallet having an arcuate end portion which merges into said flange.

13. The couping of claim 1, wherein the width of said pallet in the circumferential direction of said connector decreases in a direction from said second toward said first section.

14. The coupling of claim 1, wherein said pallet includes a portion extending in substantial parallelism with the axis of said connector and the thickness of said portion of said pallet decreases radially of said connector in a direction from said second section toward said first section.

15. The coupling of claim 1, wherein said first section has a predetermined inner diameter and the first end portion has an outer diameter which, in the undeformed condition of the first end portion, exceeds the inner diameter of said first section.

16. The coupling of claim 1, wherein said projection includes a circumferentially extending rib on said second end portion and said rib has a flank extending substantially radially of said second end portion and facing away from the first end portion when the external surface of the first end portion is surrounded by said internal surface.

17. The coupling of claim 16, wherein said rib has at least one passage and said pallet has a protuberance which registers with said passage preparatory to insertion of said first section into or extraction of said first section from said second end portion.

18. The coupling of claim 1, wherein said pallet has a tooth arranged to engage said projection and having a front flank tapering radially outwardly from said connector in a direction away from said second section.

19. The coupling of claim 1, further including annular sealing means interposed between said first section and said second end portion, said sealing means having at least one external sealing lip engaging said second end portion.

20. The coupling of claim 1, further including annular sealing means interposed between said first section and said second end portion, said sealing means having at least one internal sealing lip engaging said first section.

21. The coupling of claim 1, wherein said first section has an end portion remote from said second section and said biasing means further includes a radially outwardly extending collar adjacent the end portion of said first section.

22. The coupling of claim 21, wherein said collar extends radially outwardly beyond a portion at least of said first section.

23. The coupling of claim 1, wherein said prongs have substantially radially inwardly extending end portions within the first end portion when the external surface of the first end portion is surrounded by said internal surface.

24. The coupling of claim 23, wherein the end portions of said prongs include lugs which make oblique angles with the axis of said connector in undeformed condition of said prongs.

25. The coupling of claim 1, wherein said ring has projections extending into said slots.

26. The coupling of claim 1, wherein said ring is an elastic split ring which is received in said annulus in deformed condition so that it tends to expand and thereby urges said prongs against the first end portion when the external surface of the first end portion is surrounded by said internal surface.

27. The coupling of claim 26, wherein said ring has a smooth peripheral surface.

28. The coupling of claim 1, wherein said second section has a portion extending into said second end portion.

29. The coupling of claim 1, wherein said biasing means further includes a sleeve having a first portion surrounded by said first section and by said first end portion and a second portion including a radially outwardly extending collar disposed in said second end portion and having an outer diameter matching or approximating the inner diameter of said second end portion.

30. The coupling of claim 29, wherein said first section has an end portion remote from said second section and said collar has an end face abutting the end portion of said first section.

31. The coupling of claim 1, wherein said biasing means further includes a sleeve which is surrounded by said first section and by said first end portion and has an end portion remote from said second section, said biasing means further comprising a centering ring provided on the end portion of said sleeve and abutting said second end portion from within adjacent said first section.

32. The coupling of claim 31, wherein said first section has an end portion remote from said second section and said centering ring has an end face abutting the end portion of said first section.

33. The coupling, of claim 1, wherein said biasing means further includes a sleeve which is integral with said first section and is surrounded by said second end portion.

34. The coupling of claim 1, wherein said second end portion has an open end, a larger-diameter first internal surface adjacent said open end, a smaller-diameter second internal surface distant from said open end, and a substantially radially extending intermediate internal surface between said first and second internal surfaces, said first section having an external shoulder abutting said sealing means.

35. The coupling of claim 34, wherein said second end portion has a first frustoconical surface disposed between said second internal surface and said intermediate internal surface and tapering in a direction away from said first internal surface, said first section having a second frustoconical surface which is substantially complementary to and is surrounded by said first frustoconical surface.

36. The coupling of claim 1, wherein said second end portion has a substantially radially outwardly extending external stop and said pallet has a substantially radially inwardly extending tooth having a first flank abutting said projection and a second flank abutting said stop.

37. The coupling of claim 1, wherein said pallet includes an elongated portion extending in substantial parallelism with the axis of said connector and the length of said projection in the axial direction of said connector equals or approximates the length of the elongated portion of said pallet.

38. The coupling of claim 1, wherein said pallet comprises a first portion remote from said first section and integral with said second section, an elongated second portion which is integral with said first portion and extends in substantial parallelism with the axis of said connector, and a tooth which is integral with said second portion and releasably engages said projection, said first portion of said pallet having an opening which is aligned with said tooth.

* * * * *